(12) United States Patent
Segroves et al.

(10) Patent No.: US 10,029,922 B2
(45) Date of Patent: Jul. 24, 2018

(54) TRANSPORTABLE MULTI-CHAMBER WATER FILTRATION SYSTEMS

(71) Applicant: DENNY HASTINGS FLP 14, Shelbyville, TN (US)

(72) Inventors: Thomas Kyle Segroves, Shelbyville, TN (US); Stephen Matthew Sliger, Bell Buckle, TN (US); Kevin Brian Wolfe, Franklin, TN (US)

(73) Assignee: Denny Hastings FLP 14, Shelbyville, TN (US)

( * ) Notice: Subject to any disclaimer, the term of this patent is extended or adjusted under 35 U.S.C. 154(b) by 29 days.

(21) Appl. No.: 15/431,267

(22) Filed: Feb. 13, 2017

(65) Prior Publication Data

US 2017/0233275 A1   Aug. 17, 2017

Related U.S. Application Data

(60) Provisional application No. 62/294,794, filed on Feb. 12, 2016.

(51) Int. Cl.

| | |
|---|---|
| *C02F 1/00* | (2006.01) |
| *B01D 21/00* | (2006.01) |
| *B01D 21/08* | (2006.01) |
| *B01D 21/24* | (2006.01) |
| *B01D 36/04* | (2006.01) |
| *B01D 37/03* | (2006.01) |
| *C02F 1/56* | (2006.01) |

(52) U.S. Cl.
CPC ............ *C02F 1/004* (2013.01); *B01D 21/003* (2013.01); *B01D 21/0012* (2013.01); *B01D 21/0042* (2013.01); *B01D 21/08* (2013.01); *B01D 21/2444* (2013.01); *B01D 36/04* (2013.01); *B01D 37/03* (2013.01); *C02F 1/56* (2013.01); *C02F 2001/007* (2013.01); *C02F 2201/008* (2013.01); *C02F 2301/08* (2013.01)

(58) Field of Classification Search
None
See application file for complete search history.

(56) References Cited

U.S. PATENT DOCUMENTS

| | | | | |
|---|---|---|---|---|
| 1,465,968 | A * | 8/1923 | Caps ...................... | B01D 35/18 210/149 |
| 3,236,757 | A * | 2/1966 | Litt ..................... | C02F 1/46109 204/212 |
| 3,236,768 | A * | 2/1966 | Litt ......................... | C02F 1/001 159/1.1 |
| 3,266,630 | A * | 8/1966 | Litt ......................... | C02F 1/001 210/394 |
| 3,309,843 | A * | 3/1967 | Rigopulos ............... | H01M 8/06 159/DIG. 27 |

(Continued)

*Primary Examiner* — Robert Popovics
(74) *Attorney, Agent, or Firm* — Christopher J. Owens, Esq.; Leech Tishman Fuscaldo & Lampl

(57) ABSTRACT

A transportable multi-chamber water filtration system useable at construction sites with sources of contaminated water is disclosed. The transportable multi-chamber water filtration system removes sediment and contaminants from contaminated water by combined processes of gravitational settling, filtration and coagulation of sediment by the use of flocculants. The system provides efficient removal of sediment and contaminants from the water around various sized sites.

26 Claims, 4 Drawing Sheets

(56) References Cited

U.S. PATENT DOCUMENTS

| | | | | |
|---|---|---|---|---|
| 3,463,172 A * | 8/1969 | Naylor | B60P 1/60 | 134/169 R |
| RE27,346 E * | 4/1972 | Naylor | E03F 7/10 | 134/169 R |
| 3,700,590 A * | 10/1972 | Burton | C02F 3/06 | 210/150 |
| 3,701,428 A * | 10/1972 | Lesh | E03F 5/101 | 210/170.08 |
| 3,764,011 A * | 10/1973 | Owens | B01D 21/00 | 210/192 |
| 3,779,911 A * | 12/1973 | Freudenthal | C02F 3/082 | 210/104 |
| 3,912,533 A * | 10/1975 | Heyer | B01D 21/0042 | 127/11 |
| 3,945,918 A * | 3/1976 | Kirk | B01F 3/0473 | 210/195.1 |
| 3,994,809 A * | 11/1976 | Rhodes | B01D 17/0217 | 210/360.1 |
| 4,073,722 A * | 2/1978 | Grutsch | C02F 3/121 | 210/624 |
| 4,126,551 A * | 11/1978 | Cognevich | B01D 11/04 | 210/776 |
| 4,126,556 A * | 11/1978 | Swanson | B01D 17/0202 | 210/242.4 |
| 4,149,973 A * | 4/1979 | Harris | B01D 17/0211 | 210/305 |
| 4,162,973 A * | 7/1979 | Lynch | B01D 17/12 | 210/102 |
| 4,199,451 A * | 4/1980 | Hsiung | B01D 21/0012 | 210/260 |
| 4,292,176 A * | 9/1981 | Grutsch | B01J 20/20 | 210/616 |
| 4,316,805 A * | 2/1982 | Faust | B01D 17/0202 | 210/187 |
| 4,326,952 A * | 4/1982 | Blake | A61C 17/046 | 210/243 |
| 4,333,835 A * | 6/1982 | Lynch | B01D 17/00 | 210/305 |
| 4,367,145 A * | 1/1983 | Simpson | B01D 21/0006 | 210/241 |
| 4,378,290 A * | 3/1983 | Kennedy, Jr. | B01D 19/00 | 210/103 |
| 4,391,716 A * | 7/1983 | McCurry | B01D 17/0202 | 210/116 |
| 4,396,504 A * | 8/1983 | Tannehill | B01D 33/0353 | 208/188 |
| 4,400,274 A * | 8/1983 | Protos | B01D 17/00 | 210/302 |
| 4,469,556 A * | 9/1984 | Sanford | D21D 5/046 | 162/380 |
| 4,474,254 A * | 10/1984 | Etter | E21B 21/06 | 175/206 |
| 4,481,080 A * | 11/1984 | Mallon | C10G 1/02 | 201/32 |
| 4,659,485 A * | 4/1987 | Arbisi | B01F 3/0446 | 210/220 |
| 4,759,857 A * | 7/1988 | Acuna | B01D 35/00 | 210/741 |
| 4,824,579 A * | 4/1989 | George | B01D 17/0205 | 210/104 |
| 4,876,004 A * | 10/1989 | Verhoeff | B01D 17/0208 | 210/170.08 |
| 4,925,552 A * | 5/1990 | Bateson | C02F 3/06 | 137/576 |
| 5,004,537 A * | 4/1991 | Brown | C02F 1/78 | 210/192 |
| 5,006,264 A * | 4/1991 | Acuna | B01D 35/00 | 137/140 |
| 5,045,215 A * | 9/1991 | Lamarre | B01D 19/0005 | 210/747.7 |
| 5,062,958 A * | 11/1991 | Bateson | C02F 3/06 | 210/611 |
| 5,066,371 A * | 11/1991 | DeVoe | B01J 47/04 | 205/742 |
| 5,076,937 A * | 12/1991 | Montgomery | B01D 17/0205 | 210/705 |
| 5,104,524 A * | 4/1992 | Eiben | G21F 9/125 | 210/143 |
| 5,112,497 A * | 5/1992 | Braid | E02B 15/046 | 210/708 |
| 5,132,010 A * | 7/1992 | Ossenkop | B01D 17/0208 | 210/121 |
| 5,149,344 A * | 9/1992 | Macy | B01D 19/0042 | 166/267 |
| 5,173,179 A * | 12/1992 | DeVoe | B01J 47/04 | 210/189 |
| 5,173,184 A * | 12/1992 | Krieger | C02F 1/24 | 210/195.1 |
| 5,232,585 A * | 8/1993 | Kanow | C02F 3/101 | 210/151 |
| 5,248,415 A * | 9/1993 | Masuda | B01D 24/002 | 210/154 |
| 5,248,439 A * | 9/1993 | Derrell | B01D 17/00 | 210/201 |
| 5,288,737 A * | 2/1994 | Krieger | C02F 1/24 | 210/195.1 |
| 5,296,150 A * | 3/1994 | Taylor, Jr. | B01D 17/045 | 210/522 |
| 5,411,665 A * | 5/1995 | Scraggs | C02F 3/343 | 210/610 |
| 5,423,981 A * | 6/1995 | Krieger | C02F 1/24 | 210/195.1 |
| 5,439,597 A * | 8/1995 | Allen | B03B 9/02 | 134/25.1 |
| 5,462,670 A * | 10/1995 | Guess | C02F 1/5236 | 204/DIG. 13 |
| 5,492,620 A * | 2/1996 | Evans | B01D 21/0045 | 210/202 |
| 5,496,469 A * | 3/1996 | Scraggs | C02F 3/343 | 210/177 |
| 5,626,748 A | 5/1997 | Rose | | |
| 5,679,265 A * | 10/1997 | Van Schie | B01D 17/0211 | 210/122 |
| 5,685,976 A * | 11/1997 | Lamarre | C02F 1/20 | 210/150 |
| 5,718,015 A * | 2/1998 | Rohrbacher | A47L 11/30 | 15/321 |
| 5,759,415 A * | 6/1998 | Adams | E03F 5/125 | 210/519 |
| 5,762,810 A * | 6/1998 | Pelton | B01D 17/0211 | 210/521 |
| 5,861,093 A * | 1/1999 | Bennett | B01D 29/05 | 210/167.04 |
| 5,928,519 A * | 7/1999 | Homan | B01D 17/005 | 175/206 |
| 5,928,524 A * | 7/1999 | Casola | B01D 21/003 | 210/236 |
| 5,935,445 A * | 8/1999 | Febres | B01D 17/0205 | 210/221.2 |
| 5,935,447 A * | 8/1999 | Febres | B01D 17/0205 | 210/221.2 |
| 5,958,240 A * | 9/1999 | Hoel | B01D 17/0205 | 210/167.3 |
| 6,004,469 A * | 12/1999 | Sanders | C02F 1/705 | 210/763 |
| 6,056,128 A * | 5/2000 | Glasgow | B01D 17/0208 | 210/521 |
| 6,074,557 A * | 6/2000 | Lyles, Sr. | B01D 17/0205 | 210/112 |
| 6,139,730 A * | 10/2000 | Buehler | B01D 17/00 | 210/167.01 |
| 6,190,548 B1 * | 2/2001 | Frick | C02F 3/04 | 210/170.08 |
| 6,207,061 B1 * | 3/2001 | Pedersen | B01D 17/0208 | 210/320 |
| 6,214,092 B1 * | 4/2001 | Odom | B01D 19/0042 | 210/188 |

(56) References Cited

U.S. PATENT DOCUMENTS

| | | | | |
|---|---|---|---|---|
| 6,337,016 B1* | 1/2002 | Alper | B01D 21/0012 | 210/265 |
| 6,383,372 B1* | 5/2002 | Houck | B01D 24/042 | 210/150 |
| 6,391,195 B1* | 5/2002 | Layton | B01D 21/01 | 210/195.1 |
| 6,551,516 B1* | 4/2003 | Castleberry | B01D 17/00 | 210/221.1 |
| 6,558,558 B1* | 5/2003 | Hall | B01D 17/00 | 210/221.1 |
| 6,616,834 B2* | 9/2003 | Anderson | B01D 21/0012 | 210/155 |
| 6,669,840 B2* | 12/2003 | Burrow | A47L 11/34 | 137/124 |
| 6,673,243 B2* | 1/2004 | Srinivasan | C02F 3/284 | 210/532.2 |
| 6,676,833 B2* | 1/2004 | Castleberry | B01D 17/00 | 210/221.1 |
| 6,766,817 B2* | 7/2004 | da Silva | B41J 2/17509 | 137/1 |
| 6,797,161 B2* | 9/2004 | Use | B01D 21/0012 | 210/131 |
| 6,808,626 B2* | 10/2004 | Kulbeth | B01D 21/0018 | 175/206 |
| 6,818,126 B2* | 11/2004 | Larson | B01D 17/0214 | 210/167.04 |
| 6,821,445 B2* | 11/2004 | Miyata | B01D 24/005 | 210/254 |
| 6,824,696 B1* | 11/2004 | Tolmie | B01D 17/0211 | 210/801 |
| 6,899,808 B1 | 5/2005 | Ott | | |
| 6,932,910 B2* | 8/2005 | Miller | B01D 17/00 | 210/743 |
| 6,936,163 B2* | 8/2005 | Use | B01D 21/0012 | 210/131 |
| 6,936,179 B2* | 8/2005 | DeWald | C02F 1/78 | 210/137 |
| 6,939,461 B2* | 9/2005 | Use | B01D 21/0012 | 210/131 |
| 6,946,080 B2* | 9/2005 | Perkins | B01D 21/003 | 134/10 |
| 6,951,607 B2 | 10/2005 | Use et al. | | |
| 6,953,525 B2* | 10/2005 | LeCraw | C02F 9/005 | 210/202 |
| 6,969,414 B2* | 11/2005 | Fisher | B01D 50/002 | 210/248 |
| 6,994,783 B2* | 2/2006 | Use | B01D 21/0012 | 210/131 |
| 7,011,743 B2* | 3/2006 | Use | B01D 21/0012 | 210/131 |
| 7,022,233 B2* | 4/2006 | Chen | C02F 3/302 | 210/151 |
| 7,037,436 B2* | 5/2006 | Use | B01D 21/0012 | 210/747.3 |
| 7,060,189 B2* | 6/2006 | Miller | B01D 17/00 | 210/743 |
| 7,066,586 B2* | 6/2006 | da Silva | B41J 2/17509 | 137/1 |
| 7,074,337 B2* | 7/2006 | Miller | B01D 29/014 | 134/10 |
| 7,077,967 B2* | 7/2006 | Perkins | A23B 4/24 | 210/708 |
| 7,160,474 B2* | 1/2007 | Harding | B01D 21/0003 | 210/519 |
| 7,175,758 B2* | 2/2007 | Miller | B01D 17/00 | 210/97 |
| 7,179,372 B2* | 2/2007 | Miller | B01D 29/014 | 134/10 |
| 7,207,399 B2* | 4/2007 | Duhe | C02F 1/20 | 166/265 |
| 7,258,798 B2* | 8/2007 | LeCraw | C02F 9/005 | 210/202 |
| 7,285,255 B2* | 10/2007 | Kadlec | A61L 2/18 | 210/753 |
| 7,459,077 B2 | 12/2008 | Staschik | | |
| 7,488,418 B2* | 2/2009 | Miller | B01D 29/014 | 134/10 |
| 7,544,302 B2* | 6/2009 | Harding | E21B 21/065 | 210/519 |
| 7,578,930 B2 | 8/2009 | Williamson et al. | | |
| 7,670,551 B2* | 3/2010 | Kadlec | A61L 2/18 | 422/28 |
| 7,753,215 B2* | 7/2010 | Gigas | B01D 11/0453 | 210/511 |
| 7,799,235 B2* | 9/2010 | Olson | B01D 29/15 | 210/162 |
| 7,998,344 B2* | 8/2011 | Miller | B01D 17/0211 | 210/167.3 |
| 8,002,974 B2* | 8/2011 | Noling | C02F 1/004 | 210/116 |
| 8,034,238 B2* | 10/2011 | Ghalib | C02F 1/006 | 210/170.03 |
| 8,137,550 B1* | 3/2012 | Moe | C02F 1/56 | 175/206 |
| 8,216,459 B2* | 7/2012 | Mallonee | B09C 1/06 | 210/182 |
| 8,287,726 B2* | 10/2012 | Williams | B01D 35/10 | 210/108 |
| 8,518,268 B1 | 8/2013 | Nauertz | | |
| 8,597,522 B2* | 12/2013 | Ghalib | C02F 1/006 | 210/747.2 |
| 8,758,630 B1* | 6/2014 | Britenstine | C02F 1/32 | 210/143 |
| 8,968,571 B2* | 3/2015 | Lee | B01D 17/0205 | 210/175 |
| 9,234,341 B1 | 1/2016 | Hinkley | | |
| 2003/0070977 A1* | 4/2003 | Anderson | B01D 21/0012 | 210/301 |
| 2003/0094422 A1* | 5/2003 | Perkins | A23B 4/24 | 210/764 |
| 2003/0121847 A1* | 7/2003 | Joseph | B01D 21/0012 | 210/521 |
| 2003/0121848 A1* | 7/2003 | Use | B01D 21/0012 | 210/521 |
| 2003/0121849 A1* | 7/2003 | Use | B01D 21/0012 | 210/521 |
| 2003/0121850 A1* | 7/2003 | Use | B01D 21/0012 | 210/521 |
| 2003/0164341 A1* | 9/2003 | Use | B01D 21/0012 | 210/776 |
| 2003/0222009 A1* | 12/2003 | LeCraw | C02F 9/005 | 210/290 |
| 2005/0006320 A1* | 1/2005 | Use | B01D 21/0012 | 210/791 |
| 2006/0021953 A1* | 2/2006 | LeCraw | C02F 9/005 | 210/795 |
| 2007/0131598 A1* | 6/2007 | Miller | B01D 29/014 | 210/167.01 |
| 2008/0035547 A1* | 2/2008 | Miller | B82Y 30/00 | 210/205 |
| 2009/0101555 A1* | 4/2009 | Scarpine | C02F 1/004 | 210/170.03 |
| 2009/0114609 A1* | 5/2009 | Miller | B01D 17/0211 | 210/799 |
| 2011/0266208 A1* | 11/2011 | Miller | B01D 17/0211 | 210/257.1 |
| 2011/0297620 A1* | 12/2011 | Lee | B01D 17/0205 | 210/703 |
| 2012/0261337 A1* | 10/2012 | Weiss | C02F 9/00 | 210/626 |
| 2012/0312755 A1* | 12/2012 | Ryan | C02F 1/5281 | 210/749 |
| 2013/0015123 A1 | 1/2013 | Torres-Collazo | | |
| 2013/0020258 A1* | 1/2013 | Ellis | C02F 9/00 | 210/631 |
| 2013/0026107 A1* | 1/2013 | Miller | B01D 17/0211 | 210/747.5 |

(56) References Cited

U.S. PATENT DOCUMENTS

| | | | |
|---|---|---|---|
| 2013/0048575 A1* | 2/2013 | Gruber | C02F 1/24 |
| | | | 210/749 |
| 2013/0068698 A1 | 3/2013 | Eddy et al. | |
| 2013/0118988 A1* | 5/2013 | Xu | C02F 9/00 |
| | | | 210/707 |
| 2013/0277312 A1* | 10/2013 | Marquez | C02F 1/28 |
| | | | 210/662 |
| 2014/0299554 A1* | 10/2014 | Britenstine | C02F 1/325 |
| | | | 210/748.11 |
| 2015/0001161 A1* | 1/2015 | Wiemers | C02F 1/56 |
| | | | 210/739 |
| 2015/0114893 A1* | 4/2015 | Moll | E03F 5/16 |
| | | | 210/170.03 |
| 2017/0107134 A1* | 4/2017 | Wiemers | C02F 9/00 |
| 2017/0107135 A1* | 4/2017 | Wiemers | C02F 9/00 |
| 2017/0107136 A1* | 4/2017 | Wiemers | C02F 9/00 |
| 2017/0233275 A1* | 8/2017 | Segroves | B01D 36/04 |
| | | | 210/702 |

* cited by examiner

TRANSPORTABLE MULTI-CHAMBER WATER FILTRATION SYSTEMS

CROSS-REFERENCE TO RELATED APPLICATION

This application claims the benefit of U.S. Provisional Patent Application Ser. No. 62/294,794 filed Feb. 12, 2016, which is incorporated herein by reference.

FIELD OF THE INVENTION

The present invention relates to water filtration systems, and more particularly to mobile water filtration systems which remove sediment and filter contaminants from water.

BACKGROUND INFORMATION

The Environmental Protection Agency ("EPA") has established water standards for the release of construction related storm water. Under the EPA standards, the proper treatment of construction related storm water includes the cleaning of sediment-containing water. Current apparatuses used to implement and maintain water pollution prevention programs are often ineffective because they are too costly to operate and maintain. Another disadvantage of typical non-portable filtrations systems is that many construction sites require more than one system to adequately treat the construction related storm water that pools around the site.

SUMMARY OF THE INVENTION

The present invention provides transportable multi-chamber water filtration systems useable at construction sites with contaminated water. The transportable multi-chamber water filtration systems remove sediment and contaminants from contaminated water by combined processes of gravitational settling, filtration and coagulation of sediment by the use of flocculants. The systems provide efficient removal of sediment and contaminants from the water around various sized sites.

An aspect of the present invention is to provide a water filtration system comprising a filtration container comprising a container inlet for introducing sediment-containing water into the filtration container and a container outlet for removing treated water from the filtration container, a first filtration chamber in flow communication with the container inlet comprising an upper peripheral edge and a filter media support extending at least partially across a length and width of the first filtration chamber below the upper peripheral edge of the first filtration chamber, a first baffle chamber adjacent to the first filtration chamber having an upper overflow edge below the upper peripheral edge of the first filtration chamber and a baffle outlet below the upper overflow edge, a final stilling basin comprising a lower inlet in flow communication with the baffle outlet of the first baffle chamber and an upper peripheral edge, and a final baffle chamber adjacent to the final stilling basin having an upper overflow edge below the upper peripheral edge of the final stilling basin, and a final baffle chamber outlet in flow communication with the container outlet.

Another aspect of the present invention is to provide a method of removing sediment from construction related water and returning it to the environment comprising drawing sediment-containing water from a source of sediment-containing water into a filtration system comprising a container inlet for introducing the sediment-containing water into the filtration container and a container outlet for removing treated water from the filtration container, a first filtration chamber in flow communication with the container inlet comprising an upper peripheral edge and a filter media support extending at least partially across a length and width of the first filtration chamber below the upper peripheral edge of the first filtration chamber, a first baffle chamber adjacent to the first filtration chamber having an upper baffle edge below the upper peripheral edge of the first filtration chamber and a baffle outlet below the upper baffle edge, a final stilling basin comprising a lower inlet and an upper peripheral edge, a final baffle chamber adjacent to the final stilling basin having an upper baffle edge below the upper peripheral edge of the final stilling basin, and a final baffle chamber outlet in flow communication with the container outlet and treating the sediment-containing water in the system to remove at least a portion of the sediment from the sediment-containing water.

A further aspect of the present invention is to provide a method of removing sediment from sediment-containing water comprising: drawing sediment-containing water from a source of sediment-containing water into a pretreatment chamber, flowing the sediment-containing water through the pretreatment chamber into a first filtration chamber through a first filter medium in the first filtration chamber, overflowing the sediment-containing water from the first filtration chamber into a first baffle chamber, flowing the sediment-containing water in a second filtration chamber through a second filter medium in the second filtration chamber, overflowing the sediment-containing water from the second filtration chamber into a second baffle chamber, flowing the sediment-containing water in a third filtration chamber through a third filter medium in the third filtration chamber, overflowing the sediment-containing water from the third filtration chamber into a third baffle chamber, flowing the sediment-containing water in a first stilling basin through a fourth filter medium in the first stilling basin, overflowing the sediment-containing water from the first stilling basin into a fourth baffle chamber, flowing the sediment-containing water in a final stilling basin through a fifth filter medium in the final stilling basin, overflowing sediment-containing water from the final stilling basin into a final baffle chamber, and removing the sediment-containing water from the final baffle chamber to provide filtered water containing a lower level of sediment than that of the sediment-containing water drawn into the pretreatment chamber.

These and other aspects of the present invention will be more apparent from the following description.

DETAILED DESCRIPTION

The present invention provides transportable multi-chamber water filtration systems for removing sediment and contaminants from water. The transportable multi-chamber water filtration systems may clean contaminated storm water by combined processes of gravitational settling, filtration, flocculation and coagulation of sediment by the use of flocculants, and return the treated water to the environment in situ. As used herein, the term "floc" is a mass formed by the aggregation of a number of fine suspended solids and particles. As used herein, the term "flocculation" is the process wherein colloids and particles come out of suspension in the form of floc. As used herein, the term "sediment-containing water" is water taken from the environment and the term "filtered water" refers to water that has had a desired amount of sediment removed therefrom.

Figure 1:
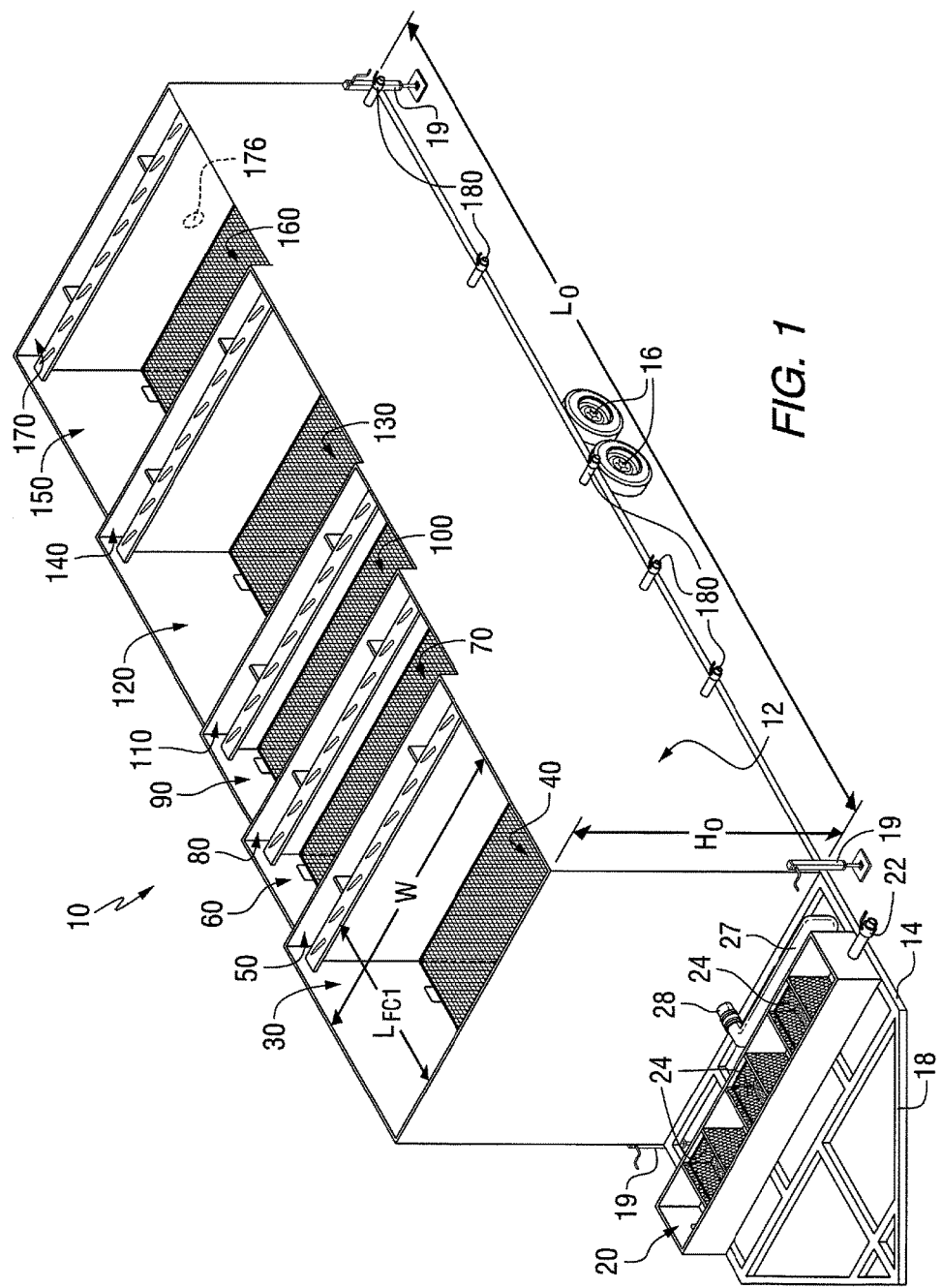
FIG. 1 is a partially schematic isometric view of a transportable multi-chamber water filtration system in accordance with an embodiment of the present invention.

FIG. 1 illustrates a transportable multi-chamber water filtration system 10 in accordance with an embodiment of the present invention. In certain embodiments, the multi-chamber water filtration system 10 is transportable by an integral trailer. In other embodiments, the multi-chamber water filtration system may not have an integral trailer and may be transportable by being placed on a trailer. In the embodiment shown, the multi-chamber water filtration system 10 comprises a filtration container 12 mounted on a trailer frame 14. In accordance with an embodiment of the present invention, the filtration container 12 may be connected to the trailer frame 14 by any suitable attachment means, such as, welding or mechanical fasteners, or may be integrally formed therewith. The trailer frame 14 may comprise axles 16, front portion 18 and leveling outriggers 19. In the embodiment shown, there are two axles 16, but any other suitable number of axles may be used. For example, there may be zero, one, three, four or more axles. In accordance with an embodiment of the present invention, the portability of the multi-chamber water filtration system 10 is a critical feature which requires that it be both roadworthy and strong enough to be transported off-road as required. The multi-chamber water filtration system 10 has been designed and configured to provide a roadworthy device which can legally travel across state and federal highways to deliver the multi-chamber water filtration system 10 to the remote locations where it is to be deployed. The leveling riggers 19 allow the multi-chamber water filtration system 10 to be leveled once the system arrives at the treatment site.

Figure 3:
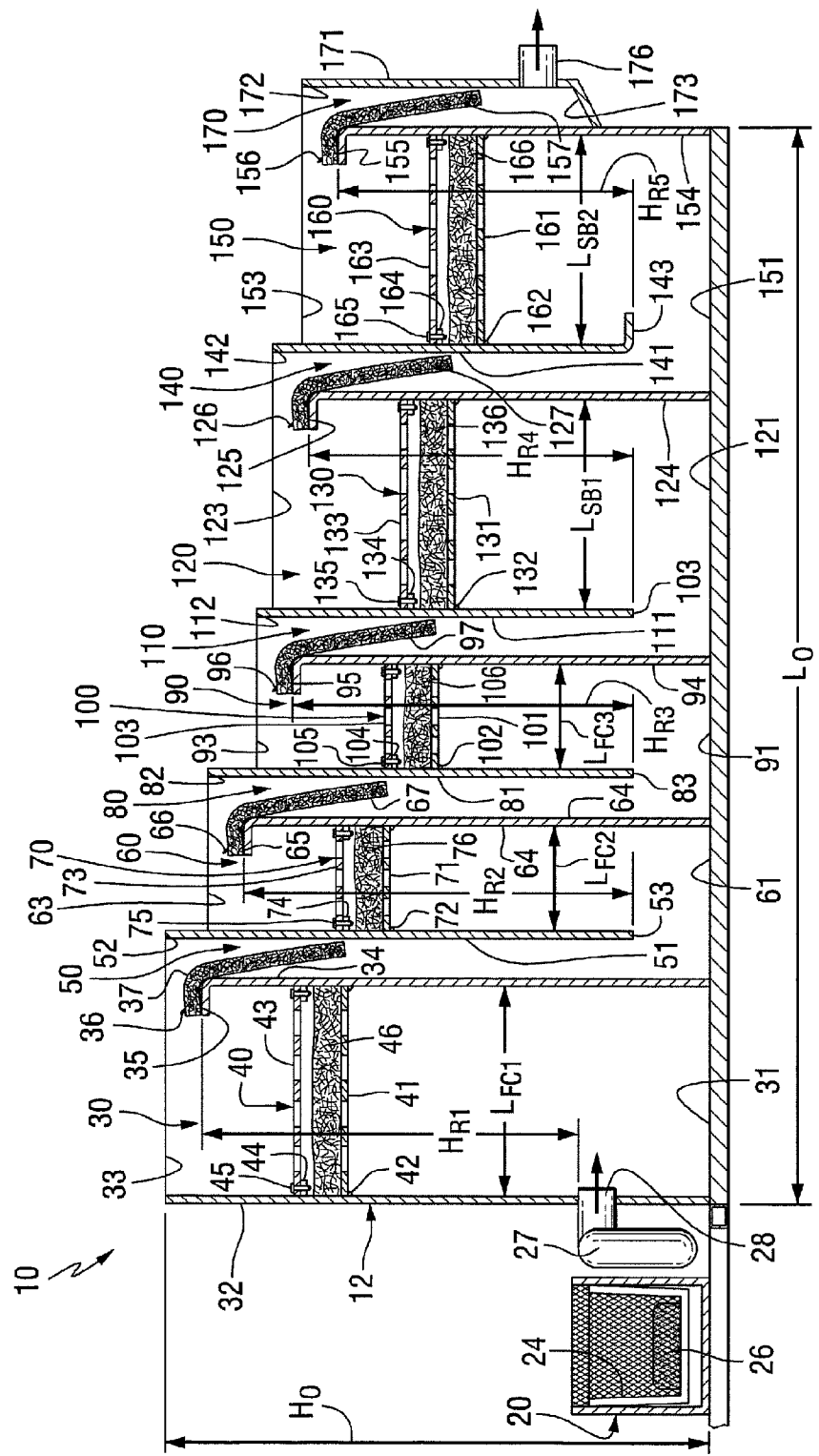
FIG. 3 is partially schematic side sectional view of the transportable multi-chamber water filtration system of FIG. 2.

In accordance with an embodiment of the present invention, the internal volume and dimensions of the filtration container 12 may vary depending on the intended use of the multi-chamber water filtration system 10. For example, the capacity of the filtration container 12 may typically range from 2000 gallons to 10,000 gallons or more. As shown in FIGS. 1 and 3, the overall length $L_O$ of the filtration container 12 may typically range from 10 to 75 feet, e.g., from 15 to 55 feet. The width W of the filtration container 12 may typically range from 3 to 12 feet, e.g., from 5 to 9 feet. The overall height $H_O$ of the filtration container 12 may typically range from 3 to 20 feet, e.g., from 5 to 14 feet. In accordance with an embodiment of the present invention, the overall height $H_O$ is less than the overall length $L_O$, e.g., the overall height $H_O$ is 50 percent less than overall length $L_O$, or less than 40 percent, or less than 30 percent.

Figure 2:
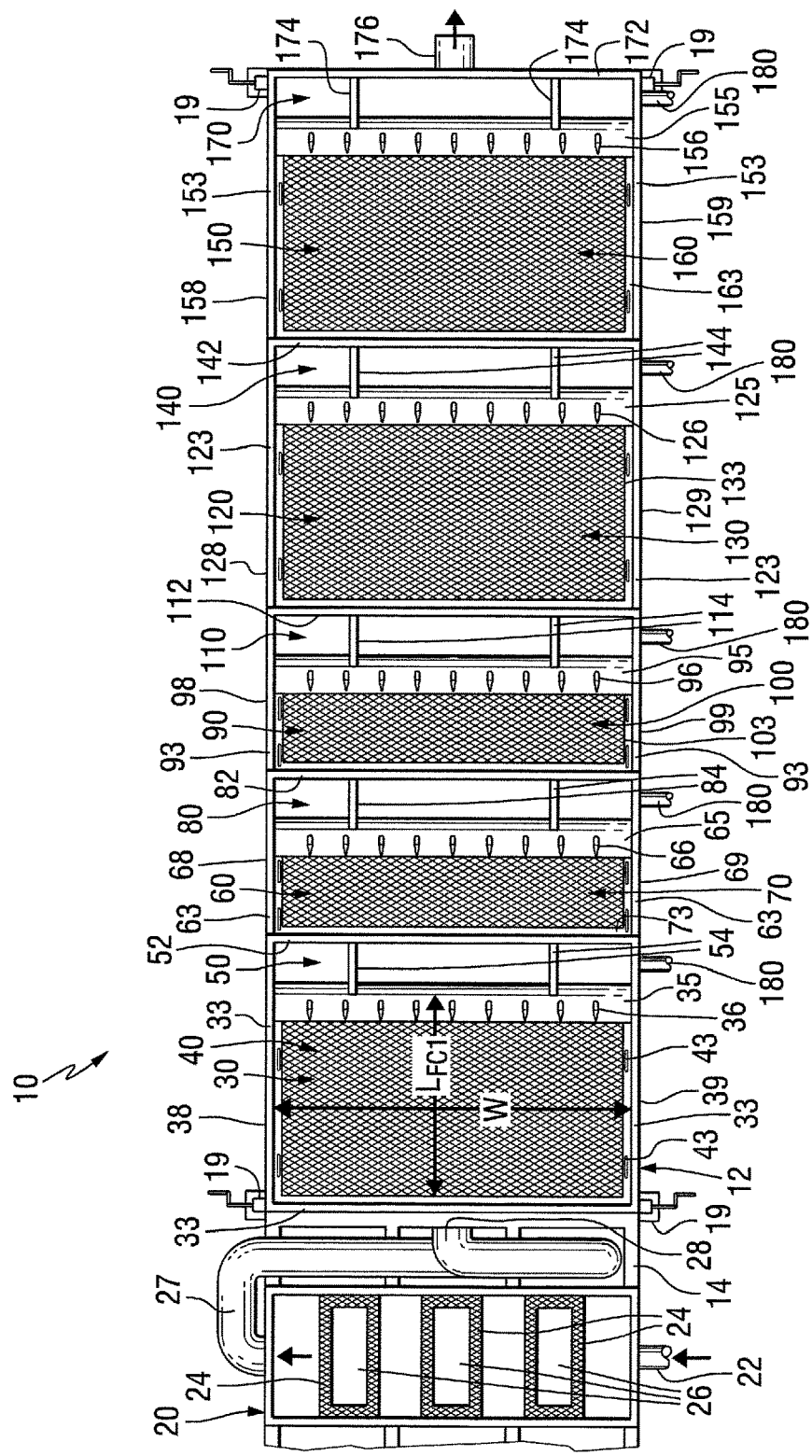
FIG. 2 is a partially schematic top view of the transportable multi-chamber water filtration system of FIG. 1.

As shown in FIGS. 1-3, the multi-chamber water filtration system 10 includes a pretreatment chamber 20. In the embodiment shown, the pretreatment chamber 20 is mounted on the front portion 18 of the trailer frame 14 outside of the filtration container 12. However, any other suitable arrangement of pretreatment chamber 20 may be used, e.g., the pretreatment chamber 20 may be mounted on the outside of the filtration container 12, the pretreatment chamber 20 may be located inside the filtration container 12, or the pretreatment chamber 20 may be eliminated.

In accordance with an embodiment of the present invention, the pretreatment chamber 20 comprises an inlet control valve 22. The inlet control valve 22 may comprise a manual gate valve, however, any other suitable valve may be used. For example, a ball valve, a butterfly valve, a globe valve, a knife valve, and the like. In accordance with an embodiment of the present invention, the inlet control valve 22 is intended to interface with a standard 3 inch diameter hose. However, the inlet control valve 22 may have any suitable size, e.g., a smaller diameter or a larger diameter for interfacing with hoses having a range of diameters. A portable water pump (not shown) may be used to feed sediment-containing water from a sediment-containing water source through the inlet control valve 22 into the pretreatment chamber 20. In accordance with an embodiment of the present invention, the inlet control valve 22 is used to control the flow of water in the multi-chamber water filtration system 10. For example, the inlet control valve 22 controls the amount of sediment-containing water that is fed from the source into the multi-chamber water filtration system 10 by the water pump. In addition, closing the inlet control valve 22 prevents water inside of the multi-chamber water filtration system 10 from flowing back into the source if the pump is no longer in operation.

As shown in FIGS. 1-3, the pretreatment chamber 20 comprises flocculant baskets 24. In the embodiment shown, there are three flocculant baskets 24, but any other suitable number of flocculant baskets may be used. For example, there may be zero, one, two, four or more flocculant baskets. In accordance with an embodiment of the present invention, the flocculant baskets 24 may hold a flocculating agent inside the pretreatment chamber 20. As shown in FIGS. 2 and 3, the flocculating agent may be provided in the form of a flocculating brick 26 held inside the flocculant baskets 24. However, the flocculating agent may be added to the pretreatment chamber 20 in any suitable form or in any suitable technique, such as pouring a powder flocculating agent directly into the pretreatment chamber, placing flocculating agent in the pretreatment chamber, attaching the flocculating agent to the walls of the pretreatment chamber, or the like. In accordance with an embodiment of the present invention, the flocculant baskets 24 are formed by expanded metal to allow the sediment-containing water to flow through the basket and come into contact with the flocculating brick 26. However, the flocculant baskets 24 may be formed with any suitable material, including metals, plastics or the like. In the embodiment shown, the flocculant baskets 24 have a bottom and four sidewalls, but any other arrangement for the basket may be used to hold the flocculating agent. For example, the walls of the pretreatment chamber 20 may form the bottom and two sidewalls of the flocculant basket.

In accordance with an embodiment of the present invention, the flocculating brick 26 may be any suitable non-ionic, anionic or cationic flocculating agent. As understood by those skilled in the art, the flocculating brick 26 may be selected based on the specific nature of the sediment-containing water that is to be filtered. For example, the flocculating brick 26 may be a water-soluble, anionic polymeric flocculating agent. The flocculating brick 26 may be a powder product in the form of a block of anionic polyacrylamide co-polymer. A flocculating brick 26 may be placed in each flocculant basket 24, and when the sediment-containing water flows through the pretreatment chamber 20, the flocculating brick 26 may release the anionic polymer such that it is dissolved into the sediment-containing water. While the use of the flocculating brick 26 in the pretreatment chamber 20 are described herein, it is to be understood that any other suitable flocculating agent may be used in accordance with the present invention. When the sediment-containing water including contaminants such as clays, soil particles or other small charged particles contacts and mixes with the flocculating agent, the dissolved polymer attaches and binds to the contaminants thereby beginning to form a floc of dissolved flocculating agent and contaminants. In accordance with an embodiment of the present invention, the pretreatment chamber 20 may include a watertight lid (not shown) that allows the flocculant baskets 24 to be accessed to add additional flocculating bricks 26.

In accordance with an embodiment of the present invention, the pretreatment chamber 20 is connected with the container inlet 28 of filtration container 12 by an inlet pipe 27. As most clearly shown in FIGS. 1-3, the inlet pipe 27 may be connected to the pretreatment chamber 20 at the end opposite to the inlet control valve 22. As shown in FIG. 2, the sediment-containing water is pumped into the pretreatment chamber 20 through the inlet control valve 22 at a first end, flows around and through the flocculant baskets 24 and exits the pretreatment chamber 20 through the inlet pipe 27. As shown in FIGS. 1-3, the inlet pipe 27 may run alongside the width of the filtration container 12 and may comprise a series of 90 degree turns before connecting with the filtration container 12. The turns of the inlet pipe 27 provide turbulent flow and hydraulic energy to allow the flocculating agents to continue to mix and dissolve into the sediment-containing water.

In accordance with an embodiment of the present invention, the filtration container 12 comprises first, second and third filtration chambers 30, 60 and 90, as shown in FIGS. 1-3. While the multi-chamber water filtration system 10 shown in FIGS. 1-3 has three filtration chambers, in other embodiments any other suitable number of filtration chambers may be used. For example, there may be zero, one, two, four or more filtration chambers. In accordance with an embodiment of the present invention, the filtration container 12 comprises first and second stilling basins 120 and 150, as shown in FIGS. 1-3. While the multi-chamber water filtration system 10 shown in FIGS. 1-3 has two stilling basins, in other embodiments any other suitable number of stilling basins may be used. For example, there may be zero, one, three, four or more stilling basins. In accordance with an embodiment of the present invention, the filtration container 12 comprises baffle chambers 50, 80, 110, 140 and 170, as shown in FIGS. 1-3. While the multi-chamber water filtration system 10 shown in FIGS. 1-3 has five baffle chambers, in other embodiments any other suitable number of baffle chambers may be used. For example, there may be zero, one, two, three, four, six or more baffle chambers.

As shown in FIGS. 1-3, the first filtration chamber 30 comprises bottom surface 31, inlet wall 32, first and second sidewalls 38 and 39, and overflow weir wall 34. The inlet wall 32 may comprise a container inlet 28 that receives the inlet pipe 27, as shown in FIGS. 1-3. In the embodiment shown, bottom surface 31, inlet wall 32, and first and second sidewalls 38 and 39 are formed by the bottom surface and walls of the filtration container 12. Alternatively, the bottom surface 31, inlet wall 32, and/or first and second sidewalls 38 and 39 may be formed by additional material mounted in the filtration container 12. In certain embodiments, the inlet wall 32 and first and second sidewalls 38 and 39 form an upper peripheral edge 33 of the first filtration chamber 30.

The overflow weir wall 34 may be connected to the filtration container 12 by welding the overflow weir wall 34 to the bottom surface 31 and the first and second sidewalls 38 and 39 to form the water tight first filtration chamber 30. Alternatively, the overflow weir wall 34 may be mounting using any other suitable method, or may be integrally formed in the first filtration chamber 30. In accordance with an embodiment of the present invention, the overflow weir wall 34 comprises an overflow edge 35 which establishes the level at which sediment-containing water overflows the filtration chamber 30. In the embodiment shown, the overflow edge 35 forms a lip that extends toward the inlet wall 32 of the first filtration chamber 30, as most clearly shown in FIGS. 1 and 3. In accordance with an embodiment of the present invention, the overflow edge 35 of the overflow weir wall 34 is formed at a height lower than the upper peripheral edge 33 of the first filtration chamber. This arrangement provides that the sediment-containing water will exit the filtration chamber 30 over the overflow weir wall 34. As shown in FIGS. 1-3 and 5, the overflow edge 35 of the overflow weir wall 34 may comprise studs 36 for securing a curtain filter 37 to the top of the overflow weir wall 34. In the embodiment shown, the studs 36 are sharpened metal rod welded to the overflow edge 35 of the overflow weir wall 34. However, any other suitable method of attaching the curtain filter 37 to the overflow weir wall 34 such as magnets, mechanical fasteners, Velcro or the like may be used. Although the overflow edge 35 shown in FIGS. 1-3 and 5 is formed as a lip that extends toward the inlet wall 32, the overflow edge 35 may have a lip extending away from the inlet wall 32, toward the bottom surface 31, or no lip and only an overflow edge 35.

In accordance with an embodiment of the present invention, the first filtration chamber 30 includes a filter media support 40. The filter media support 40 extends at least partially across a length and width of the first filtration chamber 30 below the upper peripheral edge of the first filtration chamber 30, as shown most clearly in FIGS. 1-3. In the embodiment shown, the filter media support 40 extends across the entire length and width of the first filtration chamber 30, but any other suitable arrangement may be used. For example, the filter media support 40 may extend across 50 percent of the length and width of the first filtration chamber 30 or 75 percent of the length and width of the first filtration chamber 30.

In accordance with an embodiment of the present invention, the filter media support 40 comprises a bottom panel 41 and a top panel 43 that hold a filter material 46 within the filter media support 40. In certain embodiments, the bottom panel 41 may be secured in filtration chamber 30 by welding 42 the bottom panel to the inlet wall 32, overflow weir wall 34, and/or first and second sidewalls 38 and 39. Alternatively, any other suitable method for securing the bottom panel 41 in the filtration chamber 30 may be used, e.g., mechanical fasteners or glue, or the bottom panel may be integrally formed therewith. In accordance with an embodiment of the present invention, the top panel 41 may be placed on securing blocks 44 positioned on the inlet wall 32, overflow weir wall 34, and/or first and second sidewalls 38 and 39. As shown in FIG. 3, the securing blocks 44 may include pins 45 to removably secure the top panel 43 in place. This arrangement allows the top panel 43 to be easily removed to install and replace the filter material 46. However, it is to be understood that any suitable method to secure the top panel 43 in the filtration chamber 30 may be used. For example, magnets, mechanical fasteners, welding, or the like. In accordance with an embodiment of the present invention, the top panel 43 is positioned a vertical distance from the bottom panel 41 to allow various thicknesses of filter material 46 to be placed in the filter media support 40. For example, the distance between the top plate 43 and the bottom plate 41 may typically range from 1 to 24 inches, or from 2 to 18 inches or from 3 to 12 inches. While a filter media support arrangements are described herein, it is to be understood that any other suitable filter media support arrangement may be used in accordance with the present invention. For example, the filter media support 40 may comprise only a bottom panel.

The top and bottom panels 41 and 43 may be made of any suitable materials, including metals, plastics, or the like. For example, the top and bottom panels 41 and 42 may be made of expanded steel sheet that allows the sediment-containing water to rise through the filter media support 40 as water flows into and fills the filtration chamber 30.

Figure 4:
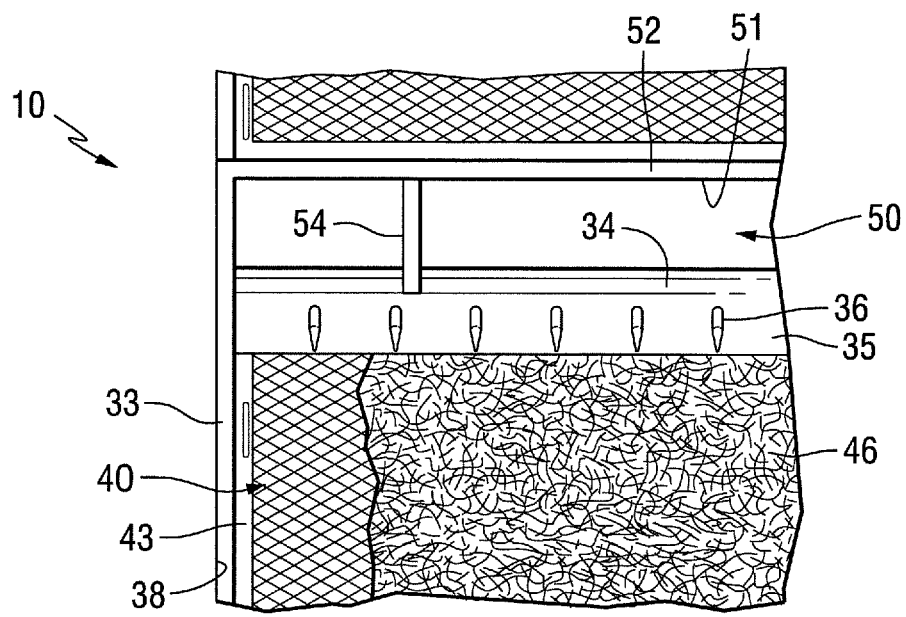
FIG. 4 is a partially schematic top view of a filter media support in accordance with an embodiment of the present invention.

As shown in detail in FIG. 4, the filter material 46 may be positioned between the bottom panel 41 and the top panel 43. In the embodiment shown, the filter material 46 is sized to completely cover the surface area of the filter media support 40. This arrangement results in all sediment-containing water flowing through the filtration chamber 30 to flow through the filter material 46. However, any other suitable size of filter material 46 may be used, e.g., sized to cover 50 percent, 60 percent or 75 percent of the filter media support 40. The filter material 46 may have a thickness selected based on characteristics of the sediment-containing water. For example, the filter material 46 may have a thickness ranging from 0.5 to 15 inches, or from 1 to 12 inches or from 1.5 to 10 inches. The filter material 46 may be a single layer of material or may consist of a number of layers. The filter material 46 may be made of any suitable materials, including natural materials, e.g., fibers or filaments of wood, silk, jute, hemp, cotton, linen, and the like, or synthetic materials, e.g., polyolefin, polyester, rayon, cellulose ester, polyvinyl, polyamide, and the like, as well as combinations of all of the above. In addition, the filter material 46 may comprise woven, non-woven and/or monolithic layers. For example, the filter material 46 may be a woven jute material.

In accordance with an embodiment of the present invention, the filter material 46 of the filter media support 40 of the first filtration chamber 30 may be treated with a flocculating agent. The flocculating agent may be any suitable non-ionic, anionic or cationic flocculating agent. In accordance with an embodiment of the present invention, the flocculating agent may include the following groups: mineral flocculants, such as activated silica, colloidal clays, metallic hydroxides and the like; natural flocculants, such as starch derivatives, polysaccharides, alginates and the like; semi-synthetic flocculants, such as chitosan and the like; and synthetic flocculants, such as polyacrylamides, polyethylene-imines, polyamides-amines, polyamines, polyethyleneoxide, sulfonated compounds and the like. In accordance with an embodiment of the present invention, the filter media 46 is treated with the flocculating agent by impregnating the filter media 46 with a dry powder. For example, a woven jute filter material 46 may be impregnated with a dry anionic polyacrylamide powder. Alternatively, additional flocculating bricks 26 or the like may be placed in the filter media support 40 along with filter material 46 that has been treated with a flocculating agent or that is substantially free of flocculating agents. In a preferred embodiment, the filter material 46 in the filter media support 40 of the first filtration chamber 30 is treated with a flocculating agent.

In accordance with an embodiment of the present invention, a first baffle chamber 50 is formed by overflow weir wall 34, first and second sidewalls 38 and 39, and baffle wall 51. Baffle wall 51 may be secured in the filtration container 12 by being welded to the first and second sidewalls 38 and 39. In another embodiment, baffle wall 51 may be connected to the first and second side walls 38 and 39 by any suitable attachment means, such as, mechanical fasteners or welding, or may be integrally formed therewith. In certain embodiments, the baffle wall 51 is placed at a distance from the overflow weir wall 34 to assure continuation of the upward flow mixing and filtration process of the multi-chamber water filtration system 10. For example, the horizontal distance between the overflow weir wall and the baffle wall may range from 1 to 10 inches, or from 2 to 8 inches or from 3 to 6 inches. The baffle wall 51 comprises a top edge 52 and a bottom edge 53. The top edge 52 may be positioned at a height substantially equal to the height of the upper peripheral walls 33 of the first filtration chamber 30. This allows the baffle wall 51 to extend above the overflow edge 35 of the overflow weir wall 34 and provides for the sediment-containing water to flow into the first baffle chamber 50. The bottom edge 53 of the baffle wall 51 may be located at a distance from the bottom surface 61 of the second filtration chamber 60. For example, the distance between the bottom edge 53 and the bottom surface 61 may typically range from 2 to 18 inches, or from 3 to 12 inches or from 4 to 10 inches. The distance between the bottom edge 53 of the baffle wall 51 and the bottom surface 61 forms a baffle outlet at the bottom of the first baffle chamber 50. The baffle outlet at the bottom of the first baffle chamber 50 corresponds to a lower inlet opening of the second filtration chamber 60. Thus, the sediment-containing water overflows from the first filtration chamber 30 into the first baffle chamber 50 and through the baffle outlet into the lower inlet opening of the second filtration chamber 60. In accordance with an embodiment of the present invention, the baffle chamber 50 may comprise supports 54 between the overflow weir wall 34 and the baffle wall 51, as most clearly shown in FIGS. 1 and 2. The supports provide additional rigidity to the first filtration chamber 30 and the first baffle chamber 50.

Figure 5:
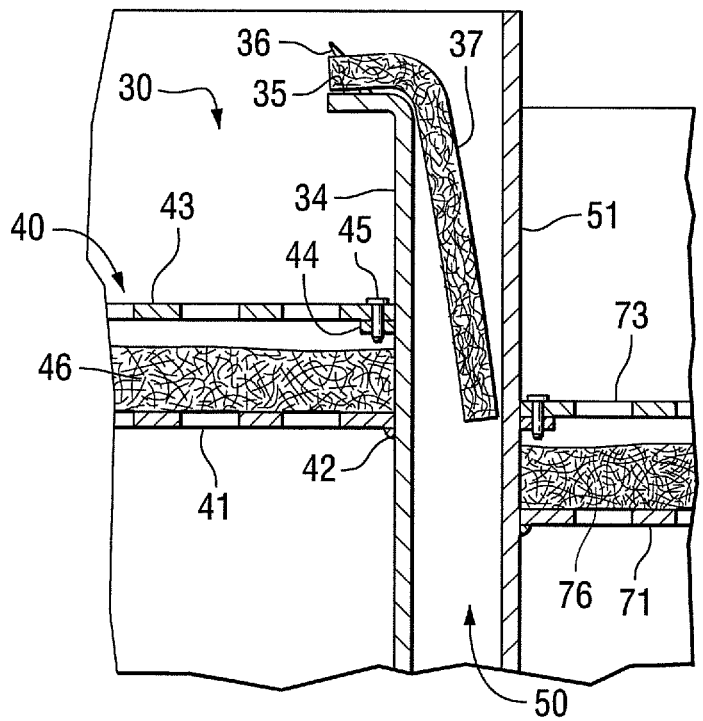
FIG. 5 is a partially schematic side view of a baffle chamber in accordance with an embodiment of the present invention.

As shown in detail in FIG. 5, the baffle chamber 50 comprises a curtain filter 37. The curtain filter 37 may extend from the overflow edge 35 of the overflow weir wall 34 into the baffle chamber 50 adjacent to the baffle wall 51. For example, the curtain filter 37 may extend a length typically ranging from 0.5 to 5 feet, or from 1 to 4 feet, or from 1.5 to 3 feet. As the sediment-containing water and flocs flow over the overflow weir wall 34, the sediment-containing water and flocs come into contact with the curtain filter 37 for additional filtering. Alternatively, the curtain filter 37 may be eliminated. In accordance with an embodiment of the present invention, the curtain filter 37 may have a thickness that allows a majority of the water flowing over the overflow weir wall 34 to pass through the curtain filter. For example, the curtain filter 37 may have a thickness typically ranging from 1 to 10 inches, or from 2 to 8 inches, or from 3 to 6 inches. The curtain filter 37 may be made from the same material as the filter material 46, or the curtain filter 37 material may be made from a different material than the filter material 46. In addition, the curtain filter 37 material may be treated or not treated with a flocculating agent. For example, the curtain filter may be a woven jute material that does not comprise a flocculating agent.

As shown in FIGS. 1-3, the second and third filtration chambers 60 and 90 may be of the same or similar construction as the first filtration chamber 30, as previously discussed. Similar element numbers are used to describe the same features found in the first filtration chamber 30. In accordance with an embodiment of the present invention, the second filtration chamber 60 comprises bottom surface 61, baffle wall 51, first and second sidewalls 68 and 69, and overflow weir wall 64. In the embodiment shown, bottom surface 61 and first and second sidewalls 68 and 69 are formed by the bottom surface and walls of the filtration container 12. In certain embodiments, the first and second sidewalls 68 and 69 form an upper peripheral edge 63 of the second filtration chamber 60.

In accordance with an embodiment of the present invention, the overflow weir wall 64 comprises an overflow edge 65 which establishes the level at which sediment-containing water overflows the second filtration chamber 60. In accordance with an embodiment of the present invention, the overflow edge 65 forms a lip that extends toward the baffle wall 51 of the first baffle chamber 50, as most clearly shown in FIGS. 1 and 3. In accordance with an embodiment of the present invention, the overflow edge 65 of the overflow weir wall 64 is formed at a height lower than the upper peripheral edge 63 of the second filtration chamber 60. In addition, the overflow edge 65 of the overflow weir wall 64 is formed at a height lower than the top edge 52 of the baffle wall 51. This arrangement provides that the sediment-containing water will exit the filtration chamber 60 over the overflow weir wall 64. As shown in FIGS. 1-3 and 5, the overflow edge 65 of the overflow weir wall 64 may comprise studs 66 for securing a curtain filter 67 to the top of the overflow weir wall 64.

In accordance with an embodiment of the present invention, the filtration chamber 60 includes a filter media support 70. The filter media support 70 extends at least partially across a length and width of the second filtration chamber 60 below the upper peripheral edge 63 of the second filtration chamber 60, as shown most clearly in FIGS. 1-3. The filter media support 70 comprises a bottom panel 71 and a top panel 73 that hold a filter material 76 within the filter media support 70. In certain embodiments, the bottom panel 71 may be secured in filtration chamber 60 by welding 62 the bottom panel to the baffle wall 51, overflow weir wall 64, and/or first and second sidewalls 68 and 69. In accordance with an embodiment of the present invention, the top panel 71 may be placed on securing blocks 74 positioned on the baffle wall 51, overflow weir wall 64, and/or first and second sidewalls 68 and 69. As shown in FIG. 3, the securing blocks 74 may include pins 75 to removably secure the top panel 73 in place. In accordance with an embodiment of the present invention, the top panel 73 is positioned a vertical distance from the bottom panel 71 to allow various thicknesses of filter material 76 to be placed in the filter media support 70.

The filter material 76 may have a thickness selected based on characteristics of the sediment-containing water. For example, the filter material 76 may have a thickness ranging from 0.5 to 15 inches, or from 1 to 12 inches or from 1.5 to 10 inches. The filter material 76 may be made of the same or different material as the filter material 46. In addition, the filter material 76 may be of the same or of a different thickness than the filter material 46.

In accordance with an embodiment of the present invention, the filter material 76 of the filter media support 70 of the filtration chamber 60 may be treated with a flocculating agent. The flocculating agent may be any suitable non-ionic, anionic or cationic flocculating agent, as previously described herein. In accordance with an embodiment of the present invention, the filter material 76 in the filter media support 70 of the filtration chamber 60 may be treated with a flocculating agent or may be substantially free of flocculating agents.

As shown in FIGS. 1-3, the second, third, fourth and final baffle chambers 80, 110, 140 and 170 may be of the same or similar construction as the first baffle chamber 50, as previously discussed. Similar element numbers are used to describe the same features found in the baffle chamber 50. In accordance with an embodiment of the present invention, baffle chamber 80 is formed by overflow weir wall 64, first and second sidewalls 68 and 69, and baffle wall 81. In certain embodiments, the baffle wall 81 is placed at a distance from the overflow weir wall 64 to assure continuation of the upward flow mixing and filtration process of the multi-chamber water filtration system 10. The baffle wall 81 comprises a top edge 82 and a bottom edge 83. The top edge 82 may be positioned at a height substantially equal to the height of the upper peripheral edge 63 of the filtration chamber 60. This allows the baffle wall 81 to extend above the overflow edge 65 of the overflow weir wall 64 and provides for the sediment-containing water to flow into the baffle chamber 80. The bottom edge 83 of the baffle wall 81 may be located at a distance from the bottom surface 91 of the filtration chamber 90. For example, the distance between the bottom edge 83 and the bottom surface 91 may typically range from 2 to 18 inches, or from 3 to 12 inches or from 4 to 10 inches. The distance between the bottom edge 83 of the baffle wall 81 and the bottom surface 91 forms a baffle outlet at the bottom of the second baffle chamber 80. The distance between the bottom edge 83 of the baffle wall 81 and the bottom surface 91 forms a baffle outlet at the bottom of the second baffle chamber 80. The baffle outlet at the bottom of the second baffle chamber 80 corresponds to a lower inlet opening of the third filtration chamber 90. Thus, the sediment-containing water overflows from the second filtration chamber 60 into the second baffle chamber 80 and through the baffle outlet into the lower inlet opening of the third filtration chamber 90. In accordance with an embodiment of the present invention, the baffle chamber 80 may comprise supports 84 between the overflow weir wall 64 and the baffle wall 81, as most clearly shown in FIGS. 1 and 2. The supports provide additional rigidity to the second filtration chamber 60 and the second baffle chamber 80.

As shown in FIG. 3, the baffle chamber 80 comprises a curtain filter 67. The curtain filter 67 may extend from the overflow edge 65 of the overflow weir wall 64 into the baffle chamber 80. As the sediment-containing water and flocs flow over the overflow weir wall 64, the sediment-containing water and flocs come into contact with the curtain filter 67 for additional filtering. Alternatively, the curtain filter 67 may be eliminated.

In accordance with an embodiment of the present invention, the third filtration chamber 90 comprises bottom surface 91, baffle wall 81, first and second sidewalls 98 and 99, and overflow weir wall 94. In the embodiment shown, bottom surface 91 and first and second sidewalls 98 and 99 are formed by the bottom surface and walls of the filtration container 12. In certain embodiments, the first and second sidewalls 98 and 99 form an upper peripheral edge 93 of third filtration chamber 90.

In accordance with an embodiment of the present invention, the overflow weir wall 94 comprises an overflow edge 95 which establishes the level at which sediment-containing water overflows the filtration chamber 90. In accordance with an embodiment of the present invention, the overflow edge 95 is formed as a lip that extends toward the baffle wall 81 of the second baffle chamber 80, as most clearly shown in FIGS. 1 and 3. In accordance with an embodiment of the present invention, the overflow edge 95 of the overflow weir wall 94 is formed at a height lower than the upper peripheral edge 93 of the third filtration chamber 90. In addition, the overflow edge 95 of the overflow weir wall 94 is formed at a height lower than the top edge 82 of the baffle wall 81. This arrangement provides that the sediment-containing water will exit the filtration chamber 90 over the overflow weir wall 94. As shown in FIGS. 1-3 and 5, the overflow edge 95 of the overflow weir wall 94 may comprise studs 96 for securing a curtain filter 97 to the top of the overflow weir wall 94.

In accordance with an embodiment of the present invention, the filtration chamber 90 includes a filter media support 100. The filter media support 100 extends at least partially across a length and width of the third filtration chamber 90 below the upper peripheral edge 93 of the third filtration chamber 90, as shown most clearly in FIGS. 1-3. In the embodiment shown, the filter media support 100 comprises a bottom panel 101 and a top panel 103 that hold a filter material 106 within the filter media support 100. In certain embodiments, the bottom panel 101 may be secured in filtration chamber 90 by welding 102 the bottom panel 101 to the baffle wall 81, overflow weir wall 94, and/or first and second sidewalls 98 and 99. In accordance with an embodiment of the present invention, the top panel 101 may be placed on securing blocks 104 positioned on the baffle wall 81, overflow weir wall 94, and/or first and second sidewalls 98 and 99. As shown in FIG. 3, the securing blocks 104 may include pins 105 to removably secure the top panel 103 in place. In accordance with an embodiment of the present invention, the top panel 103 is positioned a vertical distance from the bottom panel 101 to allow various thicknesses of filter material 106 to be placed in the filter media support 100.

The filter material 106 may have a thickness selected based on characteristics of the sediment-containing water. For example, the filter material 106 may have a thickness ranging from 0.5 to 15 inches, or from 1 to 12 inches or from 1.5 to 10 inches. The filter material 106 may be made of the same or different material as the filter material 46. In addition, the filter material 106 may be of the same or of a different thickness than the filter material 46.

In accordance with an embodiment of the present invention, the filter material 106 of the filter media support 100 of the filtration chamber 90 may be treated with a flocculating agent. The flocculating agent may be any suitable non-ionic, anionic or cationic flocculating agent, as previously described herein. In accordance with an embodiment of the present invention, the filter material 106 in the filter media support 100 of the third filtration chamber 90 may be treated with a flocculating agent or may be substantially free of flocculating agents.

In accordance with an embodiment of the present invention, baffle chamber 110 is formed by overflow weir wall 94, first and second sidewalls 98 and 99, and baffle wall 111. In certain embodiments, the baffle wall 111 is placed at a distance from the overflow weir wall 94 to assure continuation of the upward flow mixing and filtration process of the multi-chamber water filtration system 10. The baffle wall 111 comprises a top edge 112 and a bottom edge 113. The top edge 112 may be positioned at a height substantially equal to the height of the upper peripheral edge 93 of the filtration chamber 90. This allows the baffle wall 111 to extend above the overflow edge 95 of the overflow weir wall 94 and provides for the sediment-containing water to flow into the baffle chamber 110. The bottom edge 113 of the baffle wall 111 may be located at a distance from the bottom surface 121 of the stilling basin 120. For example, the distance between the bottom edge 113 and the bottom surface 121 may typically range from 2 to 18 inches, or from 3 to 12 inches or from 4 to 10 inches. The distance between the bottom edge 113 of the baffle wall 111 and the bottom surface 121 forms a baffle outlet at the bottom of the third baffle chamber 110. The baffle outlet at the bottom of the third baffle chamber 110 corresponds to a lower inlet opening of the first stilling basin 120. Thus, the sediment-containing water overflows from the third filtration chamber 90 into the third baffle chamber 110 and through the baffle outlet into the lower inlet opening of the first stilling basin 120. In accordance with an embodiment of the present invention, the baffle chamber 110 may comprise supports 114 between the overflow weir wall 94 and the baffle wall 111, as most clearly shown in FIGS. 1 and 2. The supports provide additional rigidity to the third filtration chamber 90 and the third baffle chamber 110.

As shown in FIG. 3, the baffle chamber 110 comprises a curtain filter 97. The curtain filter 97 may extend from the overflow edge 95 of the overflow weir wall 94 into the baffle chamber 110. As the sediment-containing water and flocs flow over the overflow weir wall 94, the sediment-containing water and flocs come into contact with the curtain filter 97 for additional filtering.

As shown in FIGS. 1-3, the first stilling basin 120 comprises bottom surface 121, baffle wall 111, first and second sidewalls 128 and 129, and overflow weir wall 124. In the embodiment shown, bottom surface 121 and first and second sidewalls 128 and 129 are formed by the walls of the filtration container 12. In certain embodiments, the first and second sidewalls 128 and 129 form an upper peripheral edge 123.

The overflow weir wall 124 may be connected to the filtration container 12 by welding the overflow weir wall 124 to the bottom surface 121 and first and second sidewalls 128 and 129 to form the water tight stilling basin 120. Alternatively, the overflow weir wall 34 may be integrally formed in the first stilling basin 120. The overflow weir wall 124 comprises an overflow edge 125 which establishes the level at which sediment-containing water overflows the stilling basin 120. In accordance with an embodiment of the present invention, the overflow edge 125 forms a lip that extends toward the baffle wall 111 of the third baffle chamber 110, as most clearly shown in FIGS. 1 and 3. In accordance with an embodiment of the present invention, the overflow edge 125 of the overflow weir wall 124 is formed at a height lower than the upper peripheral edge 123 of the first stilling basin 120. In addition, the overflow edge 125 of the overflow weir wall 124 is formed at a height lower than the top edge 112 of the baffle wall 111. This arrangement provides that the sediment-containing water will exit the first stilling basin 120 over the overflow weir wall 124. As shown in FIGS. 1-3 and 5, the overflow edge 125 of the overflow weir wall 124 may comprise studs 126 for securing a curtain filter 127 to the top of the overflow weir wall 124. In the embodiment shown, the studs 126 are sharpened metal rod welded to the overflow edge 125 of the overflow weir wall 124. However, any other suitable method of attaching the curtain filter to the overflow weir wall 124 such as magnets, mechanical fasteners, Velcro or the like may be used. Although the overflow edge 125 shown in FIGS. 1-3 is formed as a lip that extends toward the baffle wall 111, the overflow weir wall 124 may have a lip extending away from the baffle wall, toward the bottom surface 121, or no lip and only an overflow edge.

In accordance with an embodiment of the present invention, the first stilling basin 120 includes a filter media support 130. The filter media support 120 extends at least partially across a length and width of the first stilling basin below the upper peripheral edge 123 of the first stilling basin 120, as shown most clearly in FIGS. 1-3. In the embodiment shown, the filter media support 130 extends across the entire length and width of the first stilling basin 120, but any other suitable arrangement may be used. For example, the filter media support 130 may extend across 50 percent of the length and width of the first stilling basin 120 or 75 percent of the length and width of the first stilling basin 120.

In accordance with an embodiment of the present invention, the filter media support 130 comprises a bottom panel 131 and a top panel 133 that hold a filter material 136 within the filter media support 130. In certain embodiments, the bottom panel 131 may be secured in the first stilling basin 120 by welding 132 the bottom panel 131 to the baffle wall 111, overflow weir wall 124, and/or first and second sidewalls 128 and 129. Alternatively, any other suitable method for securing the bottom panel 131 in the stilling basin 120 may be used, e.g., mechanical fasteners or glue, or may be integrally formed therewith. In accordance with an embodiment of the present invention, the top panel 131 may be placed on securing blocks 134 positioned on the baffle wall 111, overflow weir wall 124, and/or first and second sidewalls 128 and 129. As shown in FIG. 3, the securing blocks 134 may include pins 135 to removably secure the top panel 133 in place. This arrangement allows the top panel 133 to be easily removed to install and replace the filter material 136. However, it is to be understood that any suitable method to secure the top panel 133 in the first stilling basin 120 may be used. For example, magnets, mechanical fasteners, welding, or the like. In accordance with an embodiment of the present invention, the top panel 133 is positioned a vertical distance from the bottom panel 131 to allow various thicknesses of filter material 136 to be placed in the filter media support 130. For example, the distance between the top plate 133 and the bottom plate 131 may typically range from 2 to 24 inches, or from 4 to 18 inches, or from 6 to 12 inches.

As shown in FIG. 3, the filter material 136 may be positioned between the bottom panel 131 and the top panel 133. In the embodiment shown, the filter material 136 is sized to completely cover the surface area of the filter media support 130, however, any other suitable size arrangement may be used. The filter material 136 may have a thickness selected based on characteristics of the sediment-containing water. For example, the filter material 136 may have a thickness ranging from 0.5 to 15 inches, or from 1 to 12 inches or from 1.5 to 10 inches. The filter material 136 may be made of any suitable materials, including natural materials, e.g., fibers or filaments of wood, silk, jute, hemp, cotton, linen, and the like, or synthetic materials, e.g., polyolefin, polyester, rayon, cellulose ester, polyvinyl, polyamide, and the like, as well as combinations of all of the above. In addition, the filter material 136 may comprise woven, non-woven or monolithic layers. In accordance with an embodiment of the present invention, the filter material 136 of the first stilling basin 120 may be of the same or a different thickness and/or material as the filter material 48 of the first filtration chamber 30. For example, the filter material 136 may be a woven jute material.

In accordance with an embodiment of the present invention, the filter material 136 of the filter media support 130 of the stilling basin 120 may be treated with a flocculating agent. The flocculating agent may be any suitable non-ionic, anionic or cationic flocculating agent. In a preferred embodiment, the filter material 136 of the filter media support 130 of the stilling basin 120 is substantially free of flocculating agents. This arrangement allows the filter material 136 to trap and hold both flocs and any flocculating agents in the sediment-containing water.

In accordance with an embodiment of the present invention, baffle chamber 140 is formed by overflow weir wall 124, first and second sidewalls 128 and 129, and baffle wall 141. Baffle wall 141 may be secured in the filtration container 12 by being welded to the first and second sidewalls 128 and 129. In another embodiment, baffle wall 141 may be connected to the first and second side walls 128 and 129 by any suitable attachment means, such as, mechanical fasteners or adhesive, or may be integrally formed therewith. In certain embodiments, the baffle wall 141 is placed at a distance from the overflow weir wall 124 to assure continuation of the upward flow mixing and filtration process of the multi-chamber water filtration system 10. The baffle wall 141 comprises a top edge 142 and a bottom edge 143. The top edge 142 may be positioned at a height substantially equal to the height of the upper peripheral edge 123 of the first stilling basin 120. This allows the baffle wall 141 to extend above the overflow edge 125 of the overflow weir wall 124 and provides for the sediment-containing water to flow into the baffle chamber 140. The bottom edge 143 of the baffle wall 141 may be located at a distance from the bottom surface 151 of the stilling basin 150. For example, the distance between the bottom edge 143 and the bottom surface 151 may typically range from 2 to 18 inches, or from 3 to 12 inches or from 4 to 10 inches. The distance between the bottom edge 143 of the baffle wall 141 and the bottom surface 151 forms a baffle outlet at the bottom of the fourth baffle chamber 140. The baffle outlet at the bottom of the fourth baffle chamber 140 corresponds to a lower inlet opening of the final stilling basin 150. In accordance with an embodiment of the present invention, the baffle chamber 140 may comprise supports 144 between the overflow weir wall 124 and the baffle wall 141, as most clearly shown in FIGS. 1 and 2. The supports provide additional rigidity to the first stilling basin 120 and the fourth baffle chamber 140.

As shown in FIG. 3, the baffle chamber 140 comprises a curtain filter 127. The curtain filter 127 may extend from the overflow edge 125 of the overflow weir wall 124 into the baffle chamber 140. As the sediment-containing water and flocs flow over the overflow weir wall 124, the sediment-containing water and flocs come into contact with the curtain filter 127 for additional filtering.

As shown in FIGS. 1-3, the second stilling basin 150 may be of the same or similar construction as the first stilling basin 120, as previously discussed. Similar element numbers are used to describe the same features found in the first stilling basin 120. As shown in FIGS. 1-3, the second stilling basin 150 may also be considered the final stilling basin. In accordance with an embodiment of the present invention, the second stilling basin 150 comprises bottom surface 151, baffle wall 141, first and second sidewalls 158 and 159, and overflow weir wall 154. In the embodiment shown, bottom surface 151 and first and second sidewalls 158 and 159 are formed by the walls of the filtration container 12. In certain embodiments, the first and second sidewalls 158 and 159 form an upper peripheral edge 153.

In accordance with an embodiment of the present invention, the overflow weir wall 154 comprises an overflow edge 155 establishes the level at which sediment-containing water overflows the stilling basin 150. In accordance with an embodiment of the present invention, the overflow edge 155 is formed as a lip that extends toward the baffle wall 141 of the fourth baffle chamber 110, as most clearly shown in FIGS. 1 and 3. In accordance with an embodiment of the present invention, the overflow edge 155 of the overflow weir wall 154 is formed at a height lower than the upper peripheral edge 153 of the second stilling basin 150. In addition, the overflow edge 155 of the overflow weir wall 154 is formed at a height lower than the top edge 142 of the baffle wall 141. This arrangement provides that the sediment-containing water will exit the second stilling basin 150 over the overflow weir wall 154. The overflow edge 155 of the final stilling basin 150 forms an upper outlet for the filtered water. As shown in FIGS. 1-3 and 5, the overflow edge 155 of the overflow weir wall 154 may comprise studs 156 for securing a curtain filter 157 to the top of the overflow weir wall 154.

In accordance with an embodiment of the present invention, the second stilling basin 150 includes a filter media support 160. The filter media support extends at least partially across a length and width of the second stilling basin 150 below the upper peripheral edge 153 of the second stilling basin, as shown most clearly in FIGS. 1-3. The filter media support 160 comprises a bottom panel 161 and a top panel 163 that hold a filter material 166 within the filter media support 160. In certain embodiments, the bottom panel 161 may be secured in stilling basin 150 by welding 162 the bottom panel 161 to the baffle wall 141, overflow weir wall 154, and/or first and second sidewalls 158 and 159. In accordance with an embodiment of the present invention, the top panel 161 may be placed on securing blocks 164 positioned on the baffle wall 141, overflow weir wall 154, and/or first and second sidewalls 158 and 159. As shown in FIG. 3, the securing blocks 164 may include pins 165 to removably secure the top panel 163 in place. In accordance with an embodiment of the present invention, the top panel 163 is positioned a vertical distance from the bottom panel 161 to allow various thicknesses of filter material 166 to be placed in the filter media support 160.

The filter material 166 may have a thickness selected based on characteristics of the sediment-containing water. For example, the filter material 166 may have a thickness ranging from 0.5 to 15 inches, or from 1 to 12 inches or from 1.5 to 10 inches. The filter material 166 may be made of the same or different material as the filter material 136. In addition, the filter material 166 may be of the same or of a different thickness than the filter material 136.

In accordance with an embodiment of the present invention, the filter material 166 of the filter media support 160 of the stilling basin 150 may be treated with a flocculating agent. The flocculating agent may be any suitable non-ionic, anionic or cationic flocculating agent. In a preferred embodiment, the filter material 166 of the filter media support 160 of the second stilling basin 150 is substantially free of flocculating agents. This arrangement allows the filter material 166 to trap and hold both flocs and any flocculating agents in the sediment-containing water.

In accordance with an embodiment of the present invention, baffle chamber 170 is formed by overflow weir wall 154, first and second sidewalls 158 and 159, and outlet wall 171. As shown in FIGS. 1-3, baffle chamber 170 may also be considered the final baffle chamber. Outlet wall 171 may be formed by the filtration container 12. The outlet wall 171 comprises a top edge 122 and a bottom edge 133. The top edge 172 may be positioned at a height substantially equal to the height of the upper peripheral edge 153 of the second stilling basin 150. This allows the outlet wall 171 to extend above the overflow edge 155 of the overflow weir wall 154 and provides for the filtered water to flow into the baffle chamber 170 or the final baffle chamber. The bottom edge 173 of the outlet wall 171 may be located at the bottom surface of the filtration container 12. Alternatively, the bottom edge 173 may be located at a distance higher than the bottom edge of the filtration container 12. In accordance with an embodiment of the present invention, the baffle chamber 170 may comprise supports 174 between the overflow weir wall 154 and the outlet wall 171, as most clearly shown in FIGS. 1 and 2. The supports provide additional rigidity to the final stilling basin 150 and the final baffle chamber 170.

As shown in FIG. 3, the final baffle chamber 170 comprises a curtain filter 157. The curtain filter 157 may extend from the overflow edge 155 of the overflow weir wall 154 into the baffle chamber 170. As the filtered water flows over the overflow weir wall 154, the filtered water comes into contact with the curtain filter 157 for a final filtering before being returned to the environment.

As shown in FIGS. 2 and 3, the baffle chamber 170 or the final baffle chamber has a final baffle chamber outlet 176 for returning the filtered water back to the environment. In accordance with an embodiment of the present invention, the final baffle chamber outlet 176 may typically have a diameter ranging from 2 to 10 inches, or from 4 to 8 inches. The final baffle chamber 176 may be in flow communication with a container outlet which may be engaged by any suitable sized hose or pipe to return the filtered water back to the environment.

As shown in FIG. 1, filtration chambers 30, 60 and 90 and stilling basins 120 and 150 may each have a drain valve 180 located in their respective sidewalls. The drain valve 180 may be a 3 inch gate valve, however, any other suitable size and type of valve may be used. For example, a ball valve, a butterfly valve, a globe valve, a knife valve, and the like. In certain embodiments, the diameter of the drain valve 180 may range from 1 to 10 inches, for example, from 2 to 8 inches or from 3 to 6 inches. The drain valve 180 allows the filtration container 12 to be cleaned and allows for draining for the filtration container before transportation of the multi-chamber water filtration system 10. In accordance with an embodiment of the present invention, a standard hose and pump may be attached to the drain valve located in the final stilling basin 150. The sediment-containing water may be pumped from the final stilling basin 150 into the inlet control valve of a second multi-chamber filtration system (not shown). This process may be repeated until the desired reduction in total suspended solids concentration is obtained.

In accordance with an embodiment of the present invention, the filtration chambers 30, 60 and 90 and stilling basins 120 and 150 may each have a removable plug (not shown) located in their respective bottom surfaces. The removable plug may be a 4 inch circular plug that may be removed to allow the filtration chambers 30, 60 and 90 and stilling basins 120 and 150 of the filtration container 12 to be cleaned. In accordance with another embodiment of the present invention, the filtration container 12 may have four lifting eyes (not shown) structured and arranged to allow a crane to hook to and lift the multi-chamber water filtration system 10. The four lifting eye may be located in the four corners of the filtration container 12. This arrangement allows the multi-chamber water filtration system 10 to remain level when lifted by a crane.

In accordance with an embodiment of the present invention, the filtration container 12 has a consistent width W along its overall length $L_O$, as shown in FIGS. 1 and 2. This arrangement results in the filtration chambers, baffle chambers and stilling basins to also have substantially equal widths. Alternatively, the widths of the filtration chambers, baffle chambers and stilling basins may be varied. As shown in FIG. 3, the overall height $H_O$ of the filtration container corresponds to the height of the upper peripheral edge 33 of the first filtration chamber 30.

As shown in FIG. 3, the first filtration chamber 30 has a length $L_{FC1}$, the second filtration chamber 60 has a length $L_{FC2}$ and the third filtration chamber 90 has a length $L_{FC3}$. The dimensions of the filtration chambers may be varied to assure continuation of the upward flow mixing and filtration process of the multi-chamber water filtration system 10. For example, the length $L_{FC1}$ of the first filtration chamber 30 may be from 5 to 200 percent greater, for example, from 25 to 150 percent greater, or from 50 to 125 percent greater than the length $L_{FC2}$ of the second filtration chamber 60 and the length $L_{FC3}$ of the third filtration chamber 90. In certain embodiments, the length $L_{FC1}$ of the first filtration chamber 30 is greater than the length $L_{FC2}$ of the second filtration chamber 60. For example, the ratio of $L_{FC1}:L_{FC2}$ may be from 0.5:1 to 5:1, for example, from 1:1 to 3:1. The greater the length of the filtration chamber, the longer the sediment-containing water spends in the filtration chamber. Additional time in the filtration chambers 30, 60 and 90 results in additional time for the flocculating agents to mix with the sediment-containing water and form flocs that either fall to the bottom of the filtration chambers as a result of gravity or are filtered out by the filter media supports 40, 70 and 100 or the curtain filters 37, 67 or 97.

As shown in FIG. 3, the first stilling basin 120 has a length $L_{SB1}$ and the second stilling basin 150 has a length $L_{SB2}$. The dimensions of the stilling basins may be varied to assure continuation of the upward flow mixing and filtration process of the multi-chamber water filtration system 10. For example, the length $L_{SB1}$ of the first stilling basin 120 may be from 5 to 200 percent greater, for example, from 25 to 150 percent greater, or from 50 to 125 percent greater than the length $L_{FC2}$ of the second filtration chamber 60 and the length $L_{FC3}$ of the third filtration chamber 90. This arrangement allows the velocity and turbulence of the sediment-containing water to diminish upon flowing into the first and second stilling basins 120 and 150. The sediment-containing water having a reduced velocity and turbulence allows flocs to settle on the bottom surfaces of the stilling basins and/or in the filter media supports 130 and 160 of the stilling basins. In certain embodiments, the length $L_{SB1}$ of the first stilling basin 120 is equal to the length $L_{SB2}$ of the second stilling basin 150. The greater the length of the stilling basins, the longer the sediment-containing water spends in the stilling basins. Additional time in the stilling basins results in additional time for the flocculating agents to mix with the sediment-containing water and form flocs that either fall to the bottom of the stilling basins or are filtered out by the filter media supports 130 and 160 or the curtain filters 127 or 157.

As shown in FIG. 3, the sediment-containing water introduced into the filtration container 12 rises the following rise heights in the filtration chambers and stilling basins. The sediment-containing water has a rise height $H_{R1}$ from the container inlet 28 to the overflow edge 35 to overflow from the first filtration chamber 30 into the first baffle chamber 50. The sediment-containing water has a rise height $H_{R2}$ from the lower inlet opening of the second filtration chamber 60 to the overflow edge 65 to overflow from the second filtration chamber 60 into the second baffle chamber 80. The sediment-containing water has a rise height $H_{R3}$ from the lower inlet opening of the third filtration chamber 90 to the overflow edge 95 to overflow from the third filtration chamber 90 into the third baffle chamber 110. The sediment-containing water has a rise height $H_{R4}$ from the lower inlet opening of the first stilling basin 120 to the overflow edge 125 to overflow from the first stilling basin 120 into the baffle chamber 140. The sediment-containing water has a rise height $H_{R5}$ from the lower inlet opening of the final stilling basin 150 to the overflow edge 155 to overflow filtered water from the second still basin 150 or the final stilling basin into the baffle chamber 170 or the final baffle chamber. In accordance with an embodiment of the invention, the sum of the rise heights $H_{R1}$, $H_{R2}$, $H_{R3}$, $H_{R4}$ and $H_{R5}$ is greater than the overall length $L_O$ of the filtration container 12. The elongated upflow path that the sediment-containing water travels through the filtration container 12 is extended due to the rises in the filtration chambers and stilling basins, and falls down the baffle chambers. These rises and falls provide additional time for flocculation of the colloids and particles of the sediment-containing water.

In an embodiment of the present invention, the multi-chamber water filtration system 10 is transported to a treatment site and leveled. The sediment-containing water is drawn from a source of water into the pretreatment container 20 of the multi-chamber water filtration system 10 by a standard pump and encounters a flocculating agent in the pretreatment chamber 20 so that the sediment-containing water can begin to mix with the flocculating agent. The flow rate of water into the pretreatment chamber 20 may be controlled by the inlet control valve 22 to provide sufficient detention time in the filtration container 12 to achieve the desired flocculation and coagulation of the sediment-containing water. As used herein, the term "detention time" refers the amount of time it takes for water to travel from the inlet control valve 22 to the final baffle chamber 170. For example, water flow rates of from zero to 1,000 gallons per minute (gpm) may be used, or from 50 to 750 gpm, or from 100 to 500 gpm. The flow rate of the water may be held constant, or may be varied as desired. In certain embodiments, the flow rate may be increased, reduced or stopped periodically to decrease or increase the detention time of the sediment-containing water inside the multi-chamber water filtration system. For example, detention times of from 5 to 30 minutes may be used, or from 7 to 20 minutes, or from 10 to 16 minutes.

In accordance with an embodiment of the present invention, the filtered water has a total suspended solids concentration at least 50 percent less than the total suspended solids concentration of the sediment-containing water, e.g., at least 60 percent less, or at least 75 percent less, or at least 90 percent less, or least 96 percent or more less.

The sediment-containing water is travels from the pretreatment chamber into the filtration container 12 through the inlet pipe. The inlet pipe begins the flocculation process as the flocculating agent mixes and dissolves in sediment-containing water. The sediment-containing water enters the first filtration chamber near its bottom surface and gravity reduces the velocity of the sediment-containing water. As the sediment-containing water churns in and fills the first filtration chamber, the water and flocculating agent continue to mix and stir together. As a result, flocs begin to form and fall to the bottom surface of the filtration chamber. The sediment-containing water continues to rise and flows through the filter media support. The filter medium of the filter media support is treated with additional flocculating agent and flocculation can be further enhanced. The filter medium also acts to capture some of the sediment, while the remaining sediment flows to the top of the first filtration chamber. The sediment-containing water continues to fill the filtration chamber until it rises above and flows over the overflow edge of the overflow weir wall, through the curtain filter and into the baffle chamber. The sediment-containing water flows through the baffle outlet and into the lower inlet opening of the second filtration chamber. This process is then repeated for the second and third filtration chambers. As the sediment-containing water continues to be exposed to and mix with the flocculating agents, flocs continue to form and fall to the bottom of the filtration chambers, or get trapped in the filter media supports or curtain filters.

After the third filtration chamber, the sediment-containing water enters a first stilling basin from the baffle outlet of the third baffle chamber. The stilling basin is wider than the preceding filtration chamber. This arrangement allows the velocity and turbulence of the sediment-containing water to diminish. The inactivity of the sediment-containing water in the stilling basin allows for the flocculation of the colloids and particles. The filter medium of the filter media support of the first stilling basin is substantially free of additional flocculating agents. In addition, the sediment-containing water is in contact with the filter media supports of the stilling basins for a longer duration. This longer contact allows for both flocs and the flocculating agent to be trapped in the filter medium of the stilling basins. The sediment-containing water continues to fill the stilling basin until it rises above and flows over the overflow edge of the overflow weir wall, through the curtain filter and into the baffle chamber. This process is then repeated for the second and final stilling basin.

In accordance with an embodiment of the present invention, the desired amount of sediment will have been removed from the sediment-containing water once it flows through the second stilling basin. Thus, the water that flow over the overflow edge of the overflow weir wall of the second stilling basin and through the final curtain filter may be considered the filtered water. The filtered water flows from the second stilling basin into the final baffle chamber. The filtered water is then returned to the environment containing a lower level of sediment than the sediment level of the sediment-containing water drawn into the pretreatment chamber. Prior to the release of any filtered water, samples are taken and on-site testing is done to assure that the filtered water meets the applicable EPA water standards.

The filtration chamber 12 and pretreatment chamber 20 may be made of any suitable materials such as plain steel, stainless steel, galvanized steel, aluminum, plastics and the like. For example, the filtration container 12 and the pretreatment chamber 20 may be made of one quarter inch steel plate.

The following example is intended to illustrate various aspects of the present invention, and is not intended to limit the scope of the invention.

EXAMPLE

A multi-chamber water filtration system as described herein is transported to a treatment site and leveled. The system is operated as follows: sediment-containing water containing a total suspended solids concentration of about 4000 milligrams per liter (mg/L) is pumped in a standard 3 inch fire hose from a source of construction water with a standard pump operating at about 350 gallons per minute into the inlet control valve of the pretreatment chamber. The sediment-containing water flows through the pretreatment chamber and the anionic polyacrylamide co-polymer flocculating agent of the flocculating brick dissolves into the water. The sediment-containing water flows from the pretreatment chamber into the inlet pipe to the container inlet.

The sediment-containing water flows from the container inlet into the first filtration chamber and begins to rise in the first filtration chamber. The sediment-containing water passes through the filter medium of the filter media trap of the first filtration chamber. The filter medium of the filter media trap of the first filtration chamber consists of a 3 inch woven jute material that was impregnated with a dry anionic polyacrylamide co-polymer powder. The sediment-laden water continues to rise in the first filtration chamber until it reaches the upper overflow edge of the first baffle chamber and flows into the baffle chamber over and through the curtain filter. The curtain filter of the first baffle chamber consists of a 3 inch woven jute material that is substantially free of any flocculating agent and hangs 2 feet into the first baffle chamber.

The sediment-containing water flows from the baffle outlet of the first baffle chamber into the second filtration chamber and begins to rise in the second filtration chamber. The sediment-containing water passes through the filter medium of the filter media trap of the second filtration chamber. The filter medium of the filter media trap of the second filtration chamber consists of a 3 inch woven jute material that is substantially free of any flocculating agent. The sediment-laden water continues to rise in the second filtration chamber until it reaches the upper overflow edge of the second baffle chamber and flows into the baffle chamber over and through the curtain filter. The curtain filter of the second baffle chamber consists of a 3 inch woven jute material that is substantially free of any flocculating agent and hangs 2 feet into the second baffle chamber.

The sediment-containing water flows from the baffle outlet of the second baffle chamber into the third filtration chamber and begins to rise in the third filtration chamber. The sediment-containing water passes through the filter medium of the filter media trap of the third filtration chamber. The filter medium of the filter media trap of the third filtration chamber consists of a 3 inch woven jute material that is substantially free of any flocculating agent. The sediment-laden water continues to rise in the third filtration chamber until it reaches the upper overflow edge of the third baffle chamber and flows into the baffle chamber over and through the curtain filter. The curtain filter of the third baffle chamber consists of a 3 inch woven jute material that is substantially free of any flocculating agent and hangs 2 feet into the third baffle chamber.

The sediment-containing water flows from the baffle outlet of the third baffle chamber into the first stilling basin and begins to rise in the first stilling basin. The first stilling basin has a length greater than the lengths of the second and third filtration chambers. The sediment-containing water passes through the filter medium of the filter media trap of the first stilling basin. The filter medium of the filter media trap of the first stilling basin consists of a 3 inch woven jute material that is substantially free of any flocculating agent. The sediment-laden water continues to rise in the first stilling basin until it reaches the upper overflow edge of the fourth baffle chamber and flows into the baffle chamber over and through the curtain filter. The curtain filter of the fourth baffle chamber consists of a 3 inch woven jute material that is substantially free of any flocculating agent and hangs 2 feet into the fourth baffle chamber.

The sediment-containing water flows from the baffle outlet of the fourth baffle chamber into the second stilling basin and begins to rise in the final stilling basin. The sediment-containing water passes through the filter medium of the filter media trap of the final stilling basin. The filter medium of the filter media trap of the final stilling basin consists of a 3 inch woven jute material that is substantially free of any flocculating agent. The filtered water continues to rise in the final stilling basin until it reaches the upper overflow edge of the final baffle chamber and flows into the final baffle chamber over and through the curtain filter. The curtain filter of the final baffle chamber consists of a 3 inch woven jute material that is substantially free of any flocculating agent and hangs 2 feet into the final baffle chamber.

The filtered water then exits the system from the container outlet in a 6 inch diameter hose containing a total suspended solids concentration of less than 160 mg/L. Thus, about 96;% of the total suspended solids were removed at a 12 minute detention time.

Whereas particular embodiments of this invention have been described above for purposes of illustration, it will be evident to those skilled in the art that numerous variations of the details of the present invention may be made without departing from the invention as defined in the appended claims.

What is claimed is:

1. A water filtration system comprising:
    a filtration container comprising a container inlet for introducing sediment-containing water into the filtration container and a container outlet for removing treated water from the filtration container;
    a first filtration chamber in flow communication with the container inlet comprising an upper peripheral edge and, a filter material supported by a filter media support extending at least partially across a length and width of the first filtration chamber below the upper peripheral edge of the first filtration chamber;
    a first baffle chamber adjacent to the first filtration chamber having an upper overflow edge below the upper peripheral edge of the first filtration chamber and a baffle outlet below the upper overflow edge;
    a curtain filter affixed to said upper overflow edge and extending down into said first baffle chamber;
    a final stilling basin comprising a lower inlet in flow communication with the baffle outlet of the first baffle chamber and an upper peripheral edge; and
    a final baffle chamber adjacent to the final stilling basin having an upper overflow edge below the upper peripheral edge of the final stilling basin, and a final baffle chamber outlet in flow communication with the container outlet.

2. The water filtration system of claim 1, further comprising a second filtration chamber comprising a lower opening in flow communication with the baffle outlet of the first baffle chamber, an upper peripheral edge, and a filter media support extending at least partially across a length and width of the second filtration chamber below the upper peripheral edge of the second filtration chamber; and
    a second baffle chamber adjacent to the second filtration chamber having an upper overflow edge below the upper peripheral edge of the second filtration chamber and a baffle outlet below the upper overflow edge of the second baffle chamber.

3. The water filtration system of claim 2, further comprising a third filtration chamber comprising a lower opening in flow communication with the baffle outlet of the second baffle chamber, an upper peripheral edge, and a filter media support extending at least partially across a length and width of the third filtration chamber below the upper peripheral edge of the third filtration chamber; and
    a third baffle chamber adjacent to the third filtration chamber having an upper overflow edge below the upper peripheral edge of the third filtration chamber and a baffle outlet below the upper overflow edge of the third baffle chamber.

4. The water filtration system of claim 3, further comprising a first stilling basin comprising a lower opening in flow communication with the baffle outlet of the third baffle chamber, an upper peripheral edge, and a filter media support extending at least partially across a length and width of the first stilling basin below the upper peripheral edge of the first stilling basin; and
    a fourth baffle chamber adjacent to the first stilling basin having an upper overflow edge below the upper peripheral edge of the first stilling basin and a baffle outlet below the upper overflow edge of the fourth baffle chamber.

5. The water filtration system of claim 4, wherein the first stilling basin comprises a filter media support extending at least partially across a length and width of the first stilling basin below the upper peripheral edge of the first stilling basin, and the final stilling basin comprises a filter media support extending at least partially across a length and width of the final stilling basin below the upper peripheral edge of the final stilling basin.

6. The water filtration system of claim 5, wherein the filter media support of each filtration chamber and each stilling basin comprises a bottom panel and a top panel, and a filter material therebetween.

7. The water filtration system of claim 6, wherein the filter material comprises jute, hemp, cotton, linen, wood, silk, polyolefin, polyester, rayon, cellulose ester, polyvinyl, polyamide or a combination thereof.

8. The water filtration system of claim 7, wherein the filter material of at least the first filtration chamber contains a flocculating agent.

9. The water filtration system of claim 8, wherein the filter material of each filtration chamber contains a flocculating agent.

10. The water filtration system of claim 9, wherein the flocculating agent is an anionic polymer.

11. The water filtration system of claim 6, wherein the filter material of each stilling basin does not contain a flocculating agent.

12. The water filtration system of claim 4, wherein the upper overflow edge of each baffle chamber comprises a weir structured and arranged to engage a curtain filter, and the curtain filter is disposed adjacent to a baffle wall of each baffle chamber.

13. The water filtration system of claim 12, wherein the curtain filter comprises jute, hemp, cotton, linen, wood, silk, polyolefin, polyester, rayon, cellulose ester, polyvinyl, polyamide or a combination thereof.

14. The water filtration system of claim 1, wherein the filtration container has an overall height $H_O$ and an overall length $L_O$, and the overall height $H_O$ is at least 50 percent less than the overall length.

15. The water filtration system of claim 14, wherein first filtration chamber has a length $L_{FC}$, the second filtration chamber has a length $L_{FC2}$, the third filtration chamber has a length $L_{FC3}$, the first stilling basin has a length $L_{SB1}$, and the final stilling basin has a length $L_{SB2}$, and the first, second and third filtration chambers and the first and final stilling basins have substantially the same width W, and wherein:
    the length of the first filtration chamber $L_{FC1}$ is from 25 to 150 percent greater than the length of the second filtration chamber $L_m$ and is from 25 to 150 percent greater than the length of the third filtration chamber $L_{FC3}$, and the length of the first stilling basin $L_{SB1}$ and the length of the final stilling basin $L_{SB2}$ are greater than the length of the second filtration chamber $L_{FC2}$ and the length of the third filtration chamber $L_{FC3}$.

16. The water filtration system of claim 15, wherein sediment-containing water introduced into the filtration container rises:
   a first rise height $H_{R1}$ to overflow from the first filtration chamber into the first baffle chamber;
   a second rise height $H_{R2}$ to overflow from the second filtration chamber into the second baffle chamber;
   a third rise height $H_{R3}$ to overflow from the third filtration chamber into the third baffle chamber;
   a fourth rise height $H_{R4}$ to overflow from the first stilling basin into the fourth baffle chamber; and
   a fifth height $H_{R5}$ to overflow from the final stilling basin into the final baffle chamber.

17. The water filtration system of claim 16, wherein the first rise height $H_{R1}$ is greater than the second rise height $H_{R2}$, the second rise height $H_{R2}$ is greater than the third rise height $H_{R3}$, the third rise height $H_{R3}$ is greater than the fourth rise height $H_{R4}$, and the fourth rise height $H_{R4}$ is greater than the fifth rise height $H_{R5}$, and the sum of the first, second, third, fourth and fifth rise heights $H_{R1}$, $H_{R2}$, $H_{R3}$, $H_{R4}$ and $H_{R5}$ is greater than the overall length $L_O$ of the filtration container.

18. The water filtration system of claim 1, further comprising a pretreatment chamber in flow communication with the container inlet, wherein the pretreatment chamber comprises at least one flocculant basket structured and arranged to hold a flocculating agent while allowing the sediment-containing water to flow through the at least one flocculant basket.

19. The water filtration system of claim 18, wherein the flocculating agent comprises a flocculant brick comprising an anionic polyacrylamide co-polymer.

20. The water filtration system of claim 18, further comprising an inlet control valve structured and arranged to adjustably control flow of sediment-containing water into the pretreatment chamber.

21. A method of removing sediment from construction related water and returning it to the environment comprising the steps of:
   providing a water filtration system as recited in claim 1;
   introducing sediment-containing water from a source of sediment-containing water into the container inlet of said filtration system;
   flowing said introduced sediment-containing water through said filtration system to said container outlet, with sediment being removed as the sediment containing water flows through said filtration system; and
   returning water exiting said container outlet to the environment.

22. The method of claim 21, further comprising the step of:
   mixing the sediment-containing water with a flocculating agent.

23. The method of claim 21, wherein the sediment-containing water is introduced into the container inlet at a rate of up to 1,000 gallons per minute.

24. The method of claim 23, further comprising the step of:
   introducing the sediment-containing water into a pretreatment chamber prior to introducing the sediment-containing water into the container inlet.

25. The method of claim 24, wherein the sediment-containing water has a detention time in the pretreatment chamber and the filtration container of from 5 to 30 minutes.

26. The method of claim 21, wherein water exiting said container outlet has a total suspended solids concentration at least 75 percent less than a total suspended solids concentration of the sediment-containing water being introduced into said container inlet.

* * * * *